United States Patent
Zhu et al.

(10) Patent No.: US 10,260,936 B2
(45) Date of Patent: Apr. 16, 2019

(54) FREQUENCY-SWEEP EXPERIMENTAL METHOD FOR PREDICTING NOISE OF POWER CAPACITOR

(71) Applicant: XI'AN JIAOTONG UNIVERSITY, Xi'an, Shaanxi (CN)

(72) Inventors: Lingyu Zhu, Shaanxi (CN); Shengchang Ji, Shaanxi (CN); Jinyu Li, Shaanxi (CN); Ying Song, Shaanxi (CN); Yanjie Cui, Shaanxi (CN)

(73) Assignee: XI'AN JIAOTONG UNIVERSITY, Xi'an, Shaanxi (CN)

( * ) Notice: Subject to any disclaimer, the term of this patent is extended or adjusted under 35 U.S.C. 154(b) by 310 days.

(21) Appl. No.: 15/033,902

(22) PCT Filed: Dec. 30, 2014

(86) PCT No.: PCT/CN2014/095458
§ 371 (c)(1),
(2) Date: May 3, 2016

(87) PCT Pub. No.: WO2016/078184
PCT Pub. Date: May 26, 2016

(65) Prior Publication Data
US 2016/0349106 A1   Dec. 1, 2016

(30) Foreign Application Priority Data

Nov. 21, 2014 (CN) .......................... 2014 1 0675240

(51) Int. Cl.
*G01H 3/12* (2006.01)
*G01H 17/00* (2006.01)
(Continued)

(52) U.S. Cl.
CPC ................. *G01H 3/12* (2013.01); *G01H 1/00* (2013.01); *G01H 17/00* (2013.01); *H01G 2/22* (2013.01)

(58) Field of Classification Search
CPC ............ G01H 3/12; G01H 1/00; G01H 17/00
See application file for complete search history.

(56) References Cited

FOREIGN PATENT DOCUMENTS

CN         101793922 A    *  8/2010

OTHER PUBLICATIONS

Roget, "Study of Vibration and Audible Noise Generated by Shunt Capacitor Banks at Substations Serving Non-linear Loads", Master of Science Thesis in the University of Alabama (2011): pp. 1-99.*

(Continued)

*Primary Examiner* — Michele Fan

(57) ABSTRACT

A frequency-sweep experimental method for predicting noise of a power capacitor, comprises steps of: (1) loading the capacitor with a sine voltage excitation with a loading frequency value of ½ to 50 times of a power frequency in sequence, at an increase of half of the power frequency for each time, and measuring vibration velocity at various points on a case of the capacitor; (2) under each loading frequency, dividing vibration velocity by a square of each voltage applied; (3) calculating frequency spectrum of a square of the voltage of the capacitor according to the voltage and a current of the capacitor; (4) multiplying the frequency spectrum of the square of the voltage of the capacitor by the electromechanical vibration frequency response function value of the capacitor to obtain a vibration velocity spectrum of the case of the capacitor; (5) calculating acoustical power of the noise.

4 Claims, 2 Drawing Sheets

(51) Int. Cl.
  *G01H 1/00*    (2006.01)
  *H01G 2/22*    (2006.01)

(56) References Cited

OTHER PUBLICATIONS

Michaels et al., "Chirp Generated Acoustic Wavefield Images", Proc. of SPIE, 7984 (2011): pp. 1-11.*
Chan et al, "Swept Sin Chirps for Measuring Impulse Response", Standford Research Systems (2011): pp. 1-6.*
Shengchang Ji and et al., Study on the Noise-Level Calculation Method for Capacitor Stacks in HVDC Converter Station, IEEE Transactions on Power Delivery, Jul. 2010, pp. 1866-1873, vol. 25, No. 3, USA.
Lingyu Zhu and et al., A Noise Level Prediction Method Based on Electro-Mechanical Frequency Response Function for Capacitors, Plos One, 2013, vol. 8, Issue 12: e81651-e81651.
Michelle Clark and et al., HVDC Stations Audible Noise, Jun. 1999, Anders Nyman Jun. 1996-1999.

* cited by examiner

FREQUENCY-SWEEP EXPERIMENTAL METHOD FOR PREDICTING NOISE OF POWER CAPACITOR

CROSS REFERENCE OF RELATED APPLICATION

This is a U.S. National Stage under 35 U.S.C 371 of the International Application PCT/CN2014/095458, filed Dec. 30, 2014, which claims priority under 35 U.S.C. 119(a-d) to CN 201410675240.1, filed Nov. 21, 2014.

BACKGROUND OF THE PRESENT INVENTION

Field of Invention

The present invention relates to the technique field of calculating noise of high voltage electric power equipment, and more particularly to a frequency-sweep experimental method for predicting noise of a power capacitor.

Description of Related Arts

Though the State Grid explicitly stipulates the noise limit of the alternating current (AC) filter capacitor and requires the manufactures to provide a noise calculation report and a noise experimental report during the bidding process, the State Grid Corporation of China does not have definite demand on the noise calculating and experimental method of capacitor stacks. International Council on Large Electric systems (CIGRE) disclosed the mechanism of noise of capacitors in a technical report on audible noise of HVDC (High Voltage Direct Current) converter stations. In an Enterprise Standard Q/GDW 494-2010 of the State Grid Corporation of China, the disclosure of the CIGRE serves as the calculating standard of noise of the capacitor. As a matter of fact, the report of GIGRE fails to provide a specific method for calculating noise of a capacitor.

Currently, a capacitor noise calculating method based on an impact hammer test disclosed by Shengchang Ji et al. from Xi'an Jiao Tong University is widely adopted in the engineering. In the method, firstly, an impact hammer test based on single-point excitation and multiple-point vibration pickup is primarily utilized to obtain a vibration frequency response function; secondly, an acceleration signal of vibration on the surface of the capacitor is calculated; and thirdly, combining the relationship of the vibration and the radiation noise, noise level of the AC filter capacitor is calculated. A mechanical excitation method by impact hammer is utilized for calculating noise radiating ratio by Jinying Cheng et al. from HeFei University Technology of China. In the impact hammer experiment, the impact is applied on the case of the capacitor, so the method is only capable of obtaining the mechanical characteristics of the capacitor which is in a condition that the case is under stress. As a matter of fact, vibration of the case of the capacitor is caused by the vibration of capacitor elements, so calculating the radiation noise level of the capacitor only based on the mechanical characteristics obtained from the case stress test lacks a completed theoretical basis and an overall understanding of the transmission and the generation processes of the vibration, and thus the calculation result has an error. The applicants of the present invention had disclosed a calculation method for noise of the capacitor based on an impulsive discharge experiment and verified its feasibility. However, in the impulsive discharge experiment, because the impact excitation applied on the capacitor is significantly different from the periodic excitation actually running, the great difference in the generation process of the vibration of the capacitor causes the error in the predicted results.

SUMMARY OF THE PRESENT INVENTION

An object of the present invention is to solve a problem of precisely calculating noise of a power capacitor under a condition that the loading excitation thereof is known. Accordingly, the present invention provides a frequency-sweep experiment method for predicting noise of a power capacitor, which is simply and easy to apply, requires a low level of experimental device and has a high calculation accuracy.

A frequency-sweep experimental method for predicting noise of a power capacitor comprises: obtaining an electromechanical vibration frequency response function of a capacitor to be tested by a frequency-sweep experiment, and calculating noise level of the capacitor;

wherein the frequency-sweep experimental method for predicting noise of the power capacitor specifically comprises steps of:

(1) loading the capacitor with a sine voltage excitation with a loading frequency value of ½ to 50 times of a power frequency in sequence, at an increase of half of the power frequency for each time, and measuring vibration velocity at various points on a case of the capacitor;

(2) under each loading frequency, dividing vibration velocity by a square of each voltage applied to obtain an electromechanical vibration frequency response function value corresponding to a double frequency which has a double value of each loading frequency mentioned above;

(3) calculating frequency spectrum of a square of the voltage of the capacitor according to the voltage or a current of the capacitor;

(4) multiplying the frequency spectrum of the square of the voltage of the capacitor by the electromechanical vibration frequency response function value of the capacitor to obtain a vibration velocity spectrum of the case of the capacitor;

(5) calculating acoustical power of the noise radiated by the capacitor according to the vibration velocity spectrum of the case of the capacitor.

Preferably, a specific operation of the step (1) comprises:

dividing a surface of the case of the capacitor with evenly distributed square grids with identical size, wherein a length of a diagonal line of each of the square grids is not greater than a wavelength of sound corresponding to 50 times of the power frequency; and measuring vibration at each center of each of the square grids in sequence under each loading frequency, wherein the vibration velocity at each center of each of the square grids represents an average vibration velocity at each of the square grids.

Preferably, a specific operation of the step (2) comprises:

under each frequency, performing Fourier analysis on vibration signals to be tested, dividing amplitude of vibration velocity at double frequency which has double value of each frequency mentioned above by the square of each voltage applied, so as to obtain a value of a corresponding electromechanical vibration frequency response function.

Preferably, a specific operation of the step (3) comprises: presetting noise of a capacitor under a loading current, the loading current $$i = \sum_{k=1}^{n} I_k \sin(\omega_k t + \phi_k),$$

wherein k is a harmonic order, $I_k$ is an amplitude of a kth harmonic current, $\omega_k$ is an angular frequency of a kth harmonic wave, and $\phi_k$ is an initial phase of the kth harmonic current;

firstly, calculating the voltage of the capacitor according to quadrature of the current of the capacitor on time domain:

$$u(t) = \frac{1}{C} \int_{\tau=0}^{t} i(\tau) d\tau;$$

wherein C is a capacitance of the capacitor; and calculating a square of the voltage of the capacitor in the time domain, and obtaining frequency spectrum of the square of the voltage of the capacitor by Fourier transform;

Preferably, a specific operation of the step (5) comprises:

calculating level of radiated acoustic power of noise by each of the square grids by following formula:

$$L_W = L_v + 10 \log \frac{S}{S_0} + 10 \log \frac{\sigma}{\sigma_0} + 10 \log \frac{rc}{(rc)_0} \quad (1)$$

wherein $L_W$ is the acoustic power level of the noise, dB; $L_v$ is a vibration velocity level $$L_v = 10 \lg \frac{v^2}{v_0^2};$$

v is a vibration velocity of the case, $v_0 = 5 \times 10^{-8}$ m/s, $V_0$ is a reference velocity;

S is an acoustic radiation surface area, $S_0 = 1$ m$^2$, $S_0$ is a reference area;

σ is an acoustic radiation ratio, $\sigma_0 = 1$, $\sigma_0$ is a reference radiation ratio;

ρc is acoustic impedance of air, ρ is air density, c is sound velocity in the air, $(\rho c)_0 = 400$ kg/(m$^2$·s), wherein $(\rho c)_0$ is a reference acoustic impedance of air; and adding up all the acoustical power of the noise radiated by each of the square grids on the capacitor.

Compared with the conventional art, the method of the present invention utilizes a frequency-sweep experiment for obtaining the inherent electromechanical characteristic of the power capacitor, so as to calculate noise level of the capacitor under given operation condition. The method of the present invention is capable of achieving accuracy prediction of noise of an on-site operation capacitor without the existence of a harmonic power supply. The method of the present invention is capable of solving the problems of lacking a simple and standard method for detecting noise in the capacitor industry, lacking sufficient investment in noise reduction, so as to provide a fundamental for solving the problems in the capacitor noise.

DETAILED DESCRIPTION OF THE PREFERRED EMBODIMENT

Further description of the present invention is illustrated combining with the accompanying drawings and the preferred embodiments as follows.

Figure 1:
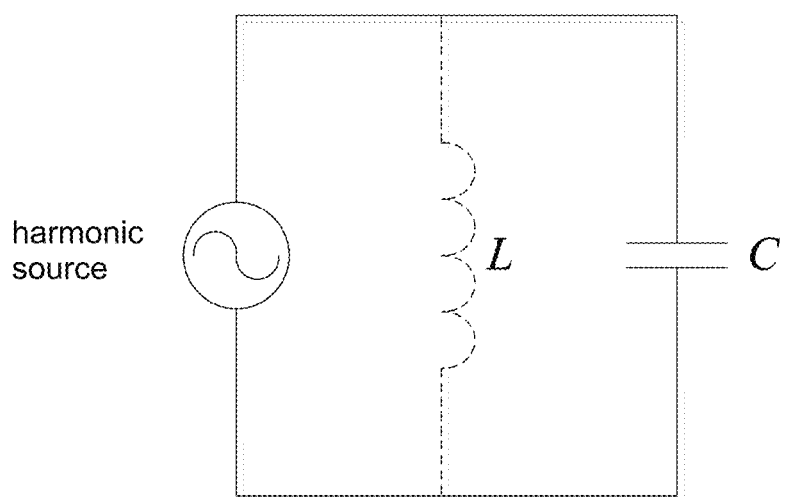
FIG. 1 is a loading circuit diagram according to a preferred embodiment of the present invention.
Figure 2:
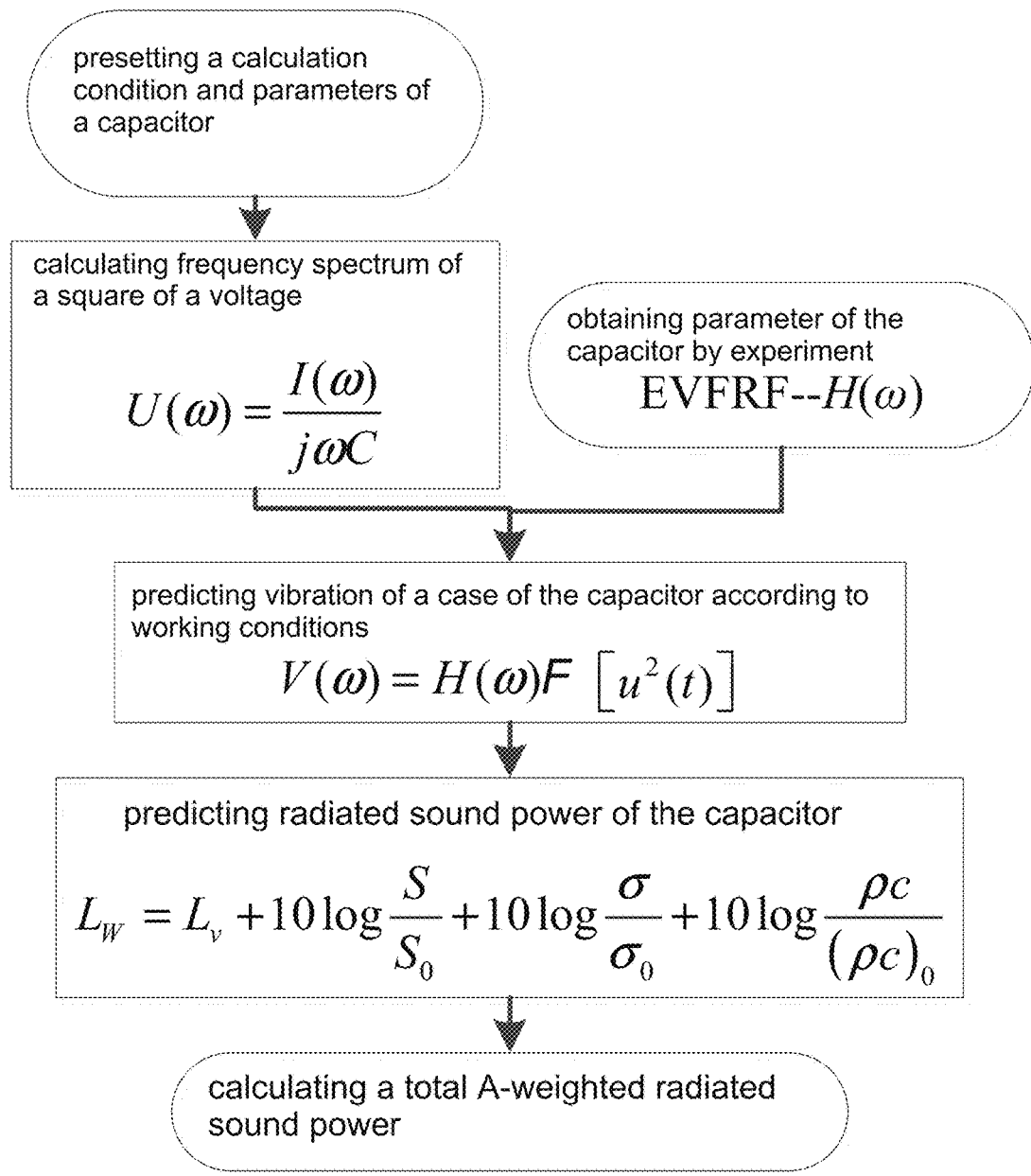
FIG. 2 is a flow chart of a frequency-sweep experimental method for predicting noise of a power capacitor according to the preferred embodiment of the present invention.

Referring to FIGS. 1-2, a frequency-sweep experimental method for predicting noise of a power capacitor comprises: obtaining an electromechanical vibration frequency response function of a capacitor to be tested by a frequency-sweep experiment, and calculating noise level of the capacitor;

wherein the frequency-sweep experimental method for predicting noise of the power capacitor specifically comprises steps of:

(1) loading the capacitor with a sine voltage excitation having a loading frequency value of ½ to 50 times of a power frequency in sequence, at an increase of half of the power frequency for each time, and measuring vibration velocity at various points on a case of the capacitor comprising steps of:

dividing a surface of the case of the capacitor with evenly distributed square grids with identical size, wherein a length of a diagonal line of each of the square grids is not greater than a wavelength of sound corresponding to 50 times of the power frequency; and measuring vibration at each center of each of the square grids in sequence under each loading frequency, wherein the vibration velocity at each center of each of the square grids represents an average vibration velocity at each of the square grids;

(2) under each loading frequency, dividing vibration velocity by a square of each voltage applied to obtain an electromechanical vibration frequency response function value corresponding to a double frequency which has a double value of each loading frequency mentioned above; wherein a specific operation comprises: under each frequency, performing Fourier analysis on vibration signals to be tested, dividing amplitude of vibration velocity at double frequency which has double value of each frequency mentioned above by the square of each voltage applied, so as to obtain a value of a corresponding electromechanical vibration frequency response function.

(3) calculating frequency spectrum of a square of the voltage of the capacitor according to the voltage or a current of the capacitor; comprising: presetting noise of a capacitor under a loading current, wherein the loading current $$i = \sum_{k=1}^{n} I_k \sin(\omega_k t + \phi_k),$$

wherein k is a harmonic order, $I_k$ is an amplitude of a kth harmonic current, $\omega_k$ is an angular frequency of a kth harmonic wave, and $\phi_k$ is an initial phase of the kth harmonic current;

firstly, calculating the voltage of the capacitor according to quadrature of the current of the capacitor on time domain:

$$u(t) = \frac{1}{C}\int_{\tau=0}^{t} i(\tau)d\tau;$$

wherein C is a capacitance of the capacitor; and calculating a square of the voltage of the capacitor in the time domain, and obtaining frequency spectrum of the square of the voltage of the capacitor by Fourier transform;

(4) multiplying the frequency spectrum of the square of the voltage of the capacitor by the electromechanical vibration frequency response function value of the capacitor to obtain a vibration velocity spectrum of the case of the capacitor;

(5) calculating acoustical power of the noise radiated by the capacitor according to the vibration velocity spectrum of the case of the capacitor;

wherein a specific operation comprises: calculating level of radiated acoustic power of noise by each of the square grids by following formula:

$$L_W = L_v + 10\log\frac{S}{S_0} + 10\log\frac{\sigma}{\sigma_0} + 10\log\frac{rc}{(rc)_0} \quad (1)$$

wherein $L_W$ is the acoustic power level of the noise, dB; $L_v$ is a vibration velocity level $$L_v = 10\lg\frac{v^2}{v_0^2};$$

v is a vibration velocity of the case, $v_0 = 5\times10^{-8}$ m/s, $V_0$ is a reference velocity;

S is an acoustic radiation surface area, $S_0 = 1$ m$^2$, $S_0$ is a reference area;

σ is an acoustic radiation ratio, $\sigma_0 = 1$, $\sigma_0$ is a reference radiation ratio;

ρc is acoustic impedance of air, ρ is air density, c is sound velocity in the air, $(\rho c)_0 = 400$ kg/(m$^2$·s), wherein $(\rho c)_0$ is a reference acoustic impedance of air; and adding up all the acoustical power of the noise radiated by each of the square grids on the capacitor.

In order to make the present invention further understood, working principle of the present invention is illustrated as follows.

Frequency-sweep experiment means applying swept frequency excitation on the capacitor, respectively measuring vibration at various points of a case of the capacitor in sequence, and calculating a ratio of vibration speed to a square of an excitation voltage on the case of the capacitor. Variation of the ratio with frequency is defined as the electromechanical vibration frequency response function value of the capacitor. The capacitor frequency-sweep experiment system comprises: a variable frequency power supply, a boosting transformer, a compensation reactor and a vibration velocity measuring device. Loading the power capacitor with a current utilizing the variable frequency power supply, wherein a swept frequency range is determined according to the requirement of noise predicting, and a sweeping interval is 1–$f_0$/2 Hz. A series compensation or parallel compensation is adopted for decreasing outputs of the variable frequency power supply. If reactive capability of a frequency source is greater than an experimental capability of the capacitor for testing, the compensation reactor can be omitted. Sampling rate and upper limit of passband frequency of the vibration measuring device should be more than twice of upper limiting frequency of the frequency sweep.

A preferred embodiment of the frequency-sweep method for loading and calculating noise radiated by the capacitor is as follows.

Applying single frequency excitation with a rated current on the capacitor with a certain model utilizing a variable frequency power supply and an amorphous alloy transformer, wherein a loading frequency is from 25 Hz to 1250 Hz, and 25 Hz serves as an interval, under each loading frequency calculating inductance of a compensation reactor according to following formula:

$$L = \frac{1}{(2\pi f)^2 C}, \quad (2)$$

wherein f is a loading frequency (with a unit Hz), C is capacitance of a test object;

evenly dividing a surface of a case of the capacitor with a plurality of grids;

under each loading frequency, respectively measuring vibration velocity at center of each grid, and dividing a virtual value of vibration of the case by a square of a loading voltage to obtain an electromechanical vibration frequency response function value of at center of each grid under each loading frequency; further obtaining electromechanical vibration frequency response function values at each point of the case of the capacitor under a frequency range of 50 Hz-2500 Hz by the method mentioned above.

When noise radiated by a capacitor loaded by three kinds of harmonic wave are required for predicting.

TABLE 1

Test Result for reference

| No. | Loading frequency and voltage | Measured acoustical power/dB(A) |
|---|---|---|
| 1 | 50 Hz/7178 V + 600 Hz/260 V | 75.3 |
| 2 | 50 Hz/6241 V + 600 Hz/390 V | 77.5 |
| 3 | 50 Hz/6241 V + 450 Hz/416 V + 650 Hz/234 V | 76.2 |

Firstly, calculating a square of the voltage of the capacitor according to a loaded voltage, and then spectrally analyzing the square of the voltage of the capacitor; secondly, multiplying frequency spectrum of the square of the voltage with the electromechanical vibration frequency response function value to obtain a vibration velocity spectrum of the case of the capacitor under a preset load; thirdly, calculating a radiated sound power of the capacitor based on an acoustic-vibration coupling formula. Comparison of calculation results and actual measurement results are shown in Table 2.

TABLE 2

Comparison of results predicted by the
frequency-sweep method and actually measured results.

| Loading condition | Predicted/ dB(A) | Actually measured/ dB(A) | error/dB(A) |
|---|---|---|---|
| No. 1 in Table 1 | 77.1 | 75.3 | 1.8 |
| No. 2 in Table 1 | 79.4 | 77.5 | 1.9 |
| No. 3 in Table 1 | 78.6 | 76.2 | 2.4 |

It can be seen from data of the Table 2 that the maximum error of the result predicted by the frequency sweeping method is 2.4 dB, and accuracy thereof is high.

What is claimed is:

1. A frequency-sweep experimental method for predicting noise of a power capacitor, comprising: obtaining an electromechanical vibration frequency response function of a capacitor to be tested by a frequency-sweep experiment, and calculating noise level of the capacitor; wherein the frequency-sweep experimental method for predicting noise of the power capacitor specifically comprises steps of:
   (1) loading the capacitor with a sine voltage excitation with a loading frequency value of ½ to 50 times of a power frequency in sequence, at an increase of half of the power frequency for each time, and measuring vibration velocity at various points on a case of the capacitor;
   (2) under each loading frequency, dividing vibration velocity by a square of each voltage applied to obtain an electromechanical vibration frequency response function value corresponding to a double frequency which is a double value of each loading frequency mentioned above;
   (3) calculating frequency spectrum of a square of the voltage of the capacitor according to the voltage or a current of the capacitor;
   (4) multiplying the frequency spectrum of the square of the voltage of the capacitor by the electromechanical vibration frequency response function value of the capacitor to obtain a vibration velocity spectrum of the case of the capacitor;
   (5) calculating acoustical power of the noise radiated by the capacitor according to the vibration velocity spectrum of the case of the capacitor.

2. The frequency-sweep experimental method for predicting noise of the power capacitor, as recited in claim 1, wherein a specific operation of the step (1) comprises:
dividing a surface of the case of the capacitor with evenly distributed square grids of identical size, wherein a length of a diagonal line of each of the square grids is not greater than a wavelength of sound corresponding to 50 times of the power frequency; and
measuring vibration at each center of each of the square grids in sequence under each loading frequency, wherein the vibration velocity at each center of each of the square grids represents an average vibration velocity at each of the square grids.

3. The frequency-sweep experimental method for predicting noise of the power capacitor, as recited in claim 1, wherein a specific operation of the step (2) comprises:
under each frequency, performing Fourier analysis on vibration signals to be tested, dividing amplitude of vibration velocity at double frequency which is a double value of each frequency mentioned above by the square of each voltage applied, so as to obtain a value of a corresponding electromechanical vibration frequency response function.

4. The frequency-sweep experimental method for predicting noise of the power capacitor, as recited in claim 1, wherein a specific operation of the step (3) comprises:
presetting noise of a capacitor under a loading current, wherein the loading current is $$i = \sum_{k=1}^{n} I_k \sin(\omega_k t + \phi_k),$$

wherein k is a harmonic order, $I_k$ is an amplitude of a kth harmonic current, $\omega_k$ is an angular frequency of a kth harmonic wave, and $\phi_k$ is an initial phase of the kth harmonic current;
firstly, calculating the voltage of the capacitor according to quadrature of the current of the capacitor on time domain:

$$u(t) = \frac{1}{C} \int_{\tau=0}^{\tau} i(\tau) d\tau;$$

wherein C is a capacitance of the capacitor; and
calculating a square of the voltage of the capacitor in the time domain, and obtaining frequency spectrum of the square of the voltage of the capacitor by Fourier transform.

* * * * *